United States Patent [19]

Liron

[11] Patent Number: 5,598,532
[45] Date of Patent: Jan. 28, 1997

[54] METHOD AND APPARATUS FOR OPTIMIZING COMPUTER NETWORKS

[75] Inventor: Moshe Liron, Palo Alto, Calif.

[73] Assignee: Optimal Networks, Palo Alto, Calif.

[21] Appl. No.: 141,180

[22] Filed: Oct. 21, 1993

[51] Int. Cl.$^6$ .................................................... G06F 13/00
[52] U.S. Cl. ................ 395/200.01; 395/800; 395/200.1; 395/200.11; 395/200.13; 370/254
[58] Field of Search .................................... 395/800, 200; 370/94.1; 364/DIG. 1, 490

[56] References Cited

U.S. PATENT DOCUMENTS

| | | | |
|---|---|---|---|
| 5,175,800 | 12/1992 | Galis et al. | 395/51 |
| 5,179,527 | 1/1993 | Lawrenz | 365/578 |
| 5,237,514 | 8/1993 | Curtin | 364/490 |
| 5,251,147 | 10/1993 | Finnerty | 364/490 |
| 5,274,643 | 12/1993 | Fisk | 370/94.1 |
| 5,359,649 | 10/1994 | Roser et al. | 379/220 |
| 5,381,404 | 1/1995 | Sugano et al. | 370/13 |
| 5,410,586 | 4/1995 | Davies | 379/14 |
| 5,465,204 | 11/1995 | Sekine et al. | 364/152 |

OTHER PUBLICATIONS

Concord Communications, Inc., "Trakker Technical Overview", 1991.
Concord Communications, Inc., "Introducing Trakker", 1991.
Concord Communications, Inc., "Trak/Report", 1993.
Dauber, Steven M., "Finding Fault", BYTE, Mar./1991, pp. 207–214.
Didio, Laura, "Dialog Tool Poses 'What If?' Questions for Upgrades", Focus, Jul. 6, 1992, p. 20.
Derfler, Frank J. Jr., "Behind the Scenes", PC Magazine, Dec. 7, 1993, pp. 335–378.
Horwitt, Elizabeth, "Ask 'What If?' Prior to Change", Focus, Aug. 11, 1986, p. 45.
Hunter, Bruce H. et al., "Surveying Far-Flung Networks", BYTE, Aug., 1992, p. 32 (reprint).
Petrovsky, Michele, "You Gotta Believe!", Lan Computing, Apr./1993, (reprint).
Peha et al., "A Cost–Based Scheduling Algorithm to Support Integrated Services", IEEE, 1991, pp. 741–753.

Primary Examiner—Meng-Ai T. An
Assistant Examiner—Walter D. Davis
Attorney, Agent, or Firm—Fenwick & West LLP

[57] ABSTRACT

An optimization method collects data regarding network topology and traffic flow and creates a network model. The model is analyzed using optimization rules and network performance objectives to determine the optimal configuration of the network according to the network performance objectives. An optimization rule for positioning a shared central resource on the network identifies the communication paths between all clients of the resource and assigns a cost value to the traffic flowing between the clients and the resource. This is repeated for each potential resource position in the network. The position having the lowest traffic cost is the optimal position for the resource. An optimization rule for partitioning network segments determines all possible partitions at the hubs of a segment and scores the performance of each possible partition, according to network performance goals. The hub partition having the lowest score is the optimal hub for partitioning the network segment.

17 Claims, 7 Drawing Sheets

FIG. 6

METHOD AND APPARATUS FOR OPTIMIZING COMPUTER NETWORKS

BACKGROUND OF THE INVENTION

1. Field of Invention

The present invention relates generally to the management of computer networks and more particularly, to methods and apparatuses for improving network performance through the configuration of network resources.

2. Description of Related Art

A computer network is a collection of autonomous computers interconnected via a communications system. The network permits the computers to share central hardware or software resources such as a particular computer, a set of particular software applications or data files such as a database, or a set of peripheral devices, including disk drives, printers, CD-ROM drives, modems, and the like. A shared central computer providing data files or applications is known as a "server"; the computers or network devices (printers, disk drives, modems, etc.) communicating with the server are known as "nodes". Where a node is computer running multiple application programs, the individual application programs are "clients" of the server. This is because each application program can communicate with the server using a different network level protocol, as further described below.

Networks are often comprised of "subnets" connected together. Typically, subnets are collections of Local area network (LAN) segments residing within a single physical structure, such as an office building. Within a LAN segment, a number of nodes are connected to a hub, and the hub is connected to other hubs to form the segment. Communication between LAN segments is accomplished with switching elements such as routers, bridges, LAN switches, and gateways. A wide area network (WAN) interconnects remotely located subnets.

The "topology" of a network is the physical and logical organization of devices on the network. The topology of the network can be generally described as rings (closed looped arrangements of nodes), buses (linear arrangements of nodes), stars (nodes radially connected), or a general mesh structure having no particular geometry.

The communication between devices on a network is governed by a collection of network protocols. Each protocol is a set of rules for communication that defines the pattern or format of data transmitted on the network, and the procedure for such transfers. Low level, or access, protocols allow network devices to connect to each other and communicate with higher level protocols. High level protocols allow the interconnection of heterogeneous subnets comprised of differing device platforms (personal computers, mainframes, or minicomputers), and access protocols.

Given the variety of topologies, protocols, and devices that can comprise a network, there are two fundamental problems in configuring networks. First, for existing networks, there is a need to optimize the configuration of network devices and topologies using actual measured performance data. Optimization is required to position shared central resources, such as server, according to its usage by the network's nodes. More particularly, the optimization question considers where in the network to position the shared central resource given:

1. The identity of the shared central resource and its clients;
2. How each client is attached to the network;
3. The amount of traffic flowing between each client and the shared central resource;
4. The network topological structure;
5. The network protocols used by the clients in communicating with the shared central resource; and
6. A set of network performance objectives to use in seeking the optimal shared central resource position, for example, minimum average communication delay or minimum hops between the clients and the shared central resource.

Similarly, optimization is needed to identify the best configuration of segments in a given area of a network in light of network traffic flow. More specifically, it is often necessary to configure the positioning of hubs within a LAN segment to improve traffic flow. The traffic flow within a network segment is generally related to the type of work done by users of the network, where users accessing common resources or files form logical, though often not physical, work groups. Accordingly, it is desirable to optimize the configuration of network segments to better balance the traffic flow requirements between such logical groups. Further, segment optimization becomes particularly significant because of the high labor cost associated with re-wiring an already existing wiring plan. In metropolitan areas such as New York city the labor cost component accounts for well over 50% of the total LAN investment. In partitioning a network segment, it is thus desirable to preserve the existing hubs, hub locations, hub to hub wiring plans, and node to hub wiring (to avoid for example the need for running new wires from a station on the 50-th floor to a hub on the 1-st floor). This is because rewiring may require shutting all use of network segment for many hours or even days (in a high rise office building). In addition, because network managers generally have various network performance objectives, in these circumstances there also is a need to optimize the network to meet these performance objectives.

Currently, network managers are limited to tools that can measure and collect performance data, such as internodal traffic, communication cycle times, error rates, segment utilization, and the like. These tools can analyze the data to determine network performance according to a number of performance parameters. In addition, other tools address the interconnection of network routers to minimize link usage costs. In either case, it remains up to the network manager, using personal knowledge and experience, to decide how to configure the network in light of the performance data to meet general performance objectives such as least delay. This process is generally one of trial and error, and typically leads to wrong solutions, resulting in economic and performance losses.

The second problem is the optimization of network design prior to actual implementation. This requires the ability to model a given network topology, including its protocols, and devices, and to simulate the actual operation of the network at all its levels. Once the network is accurately simulated, performance data can be gathered and the proposed network optimized to meet performance objectives specified by a network manager.

Current simulation tools provide only limited capability to model all the details of an actual network. These network models do not capture the internodal activity in sufficient granularity to simulate realistic network behavior. In addition, simulation tools require extensive computation time, limiting their effectiveness for real time simulation, optimization analysis and network design. Accordingly, what is needed is a simulation tool which accurately models network interaction and allows near real time simulation.

SUMMARY OF THE INVENTION

The invention provides methods and apparatuses for modeling and optimizing networks according to network performance objectives. The methods produce a network model describing the network topology, traffic patterns and protocols. This model is created by either collecting and consolidating actual topology and traffic data from the network, or by a network simulator when creating or modifying a network design, or by a combination of the two processes. Goals for network performance objectives are defined, and the network is then optimized to meet these goals. Optimization can be of LAN segments or of the position of a shared central resource.

Optimization for the purpose of finding the optimal position in the network of a shared central resource employs a "center of gravity" approach which analyzes the effectiveness of positioning the shared central resource at various locations in the network. The optimal position of the shared central resource is "the center of gravity" with respect to the clients because each client "pulls" the shared central resource in its direction at a "force" proportional to the amount of traffic between it and the shared central resource. The optimal position of the shared central resource is the "balance" point given "pulling" forces from a multiplicity of clients in different directions and pull strength.

A data packet flowing between a client and a shared central resource makes use of communication resources, such as a LAN, router, or bridge, along the path traversed by the packet. The actual path taken is governed by the network protocol transporting the packet as well as on the particular network topology. In traversing a source-destination path a data packet "hops" a particular communication resource, incurring a "hop-cost". The term "hop-cost" is used in a genetic sense and may represent dollar cost, delay cost, number of hops, etc., or a function which simultaneously depends on several variables. The optimization method serially "attaches" the shared central resource to each possible "candidate" network segment, router or other switching element and determines the total hop cost incurred in communicating with its clients. The position yielding the minimal hop cost is selected as the optimal position for the shared central resource.

The optimization of LAN segments is performed by "hub tree" optimization, which is applicable to a segment composed of hubs interconnected to a hub tree. The process repeatedly partitions the LAN segment at each of its hubs into two smaller segments, and determines the overall traffic flow patterns within and between the partitions, and scores the partitions relatives to network performance objectives. The hub yielding the partitions with the best score is the optimal hub at which the LAN segment should be partitioned.

BRIEF DESCRIPTION OF THE DRAWINGS

FIG. 6 is a pictorial illustration of bi-directional node to node traffic flow collected on a real hub LAN.

DETAILED DESCRIPTION OF THE PREFERRED EMBODIMENT

Figure 1:
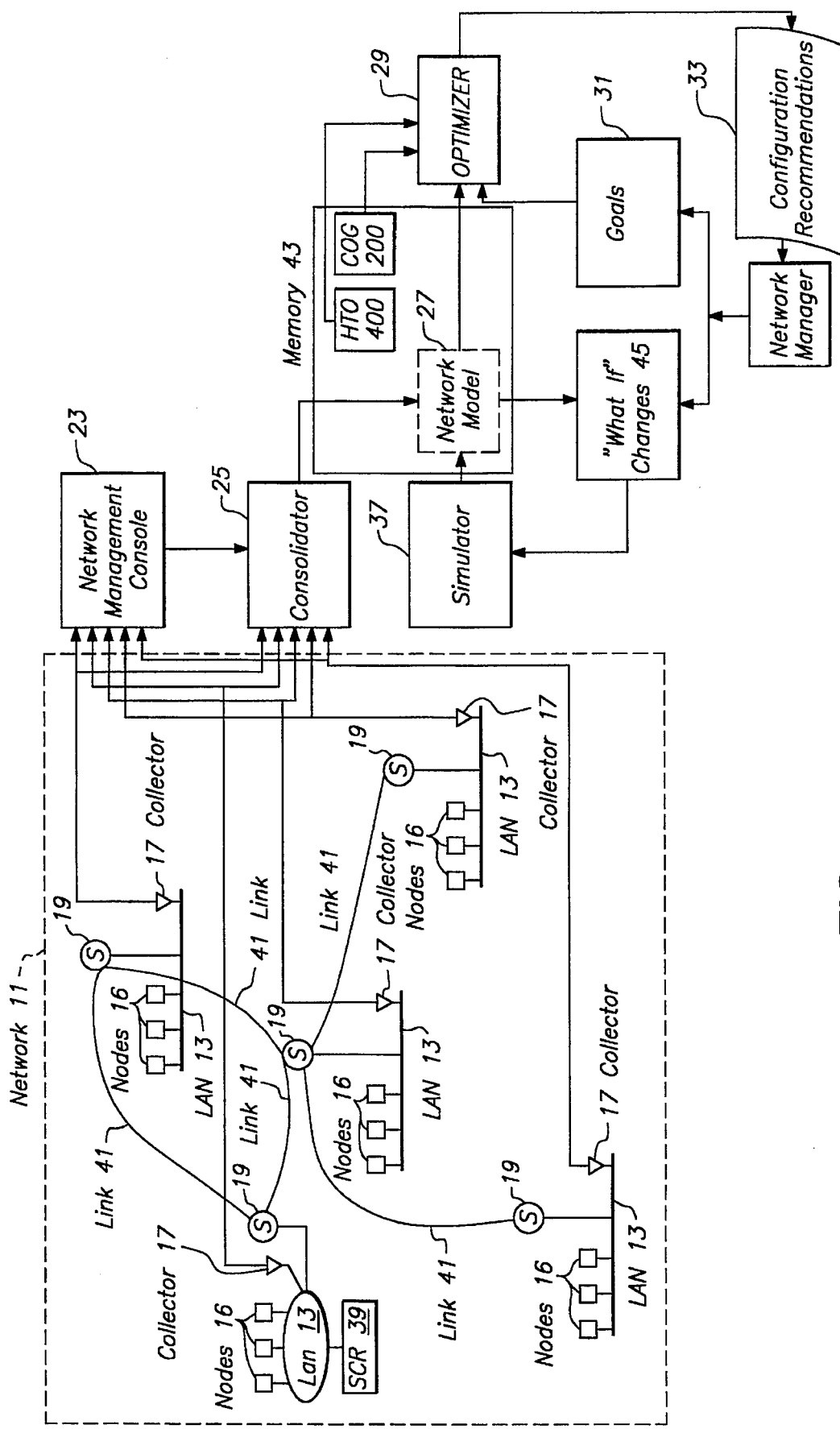
FIG. 1 is pictorial illustration of the apparatus of the present invention showing a network 11 comprised of LAN segments 13, nodes 16, switching elements 19, segment collectors 17, consolidator 25, simulator 37, and optimizer 29.
Figure 2:
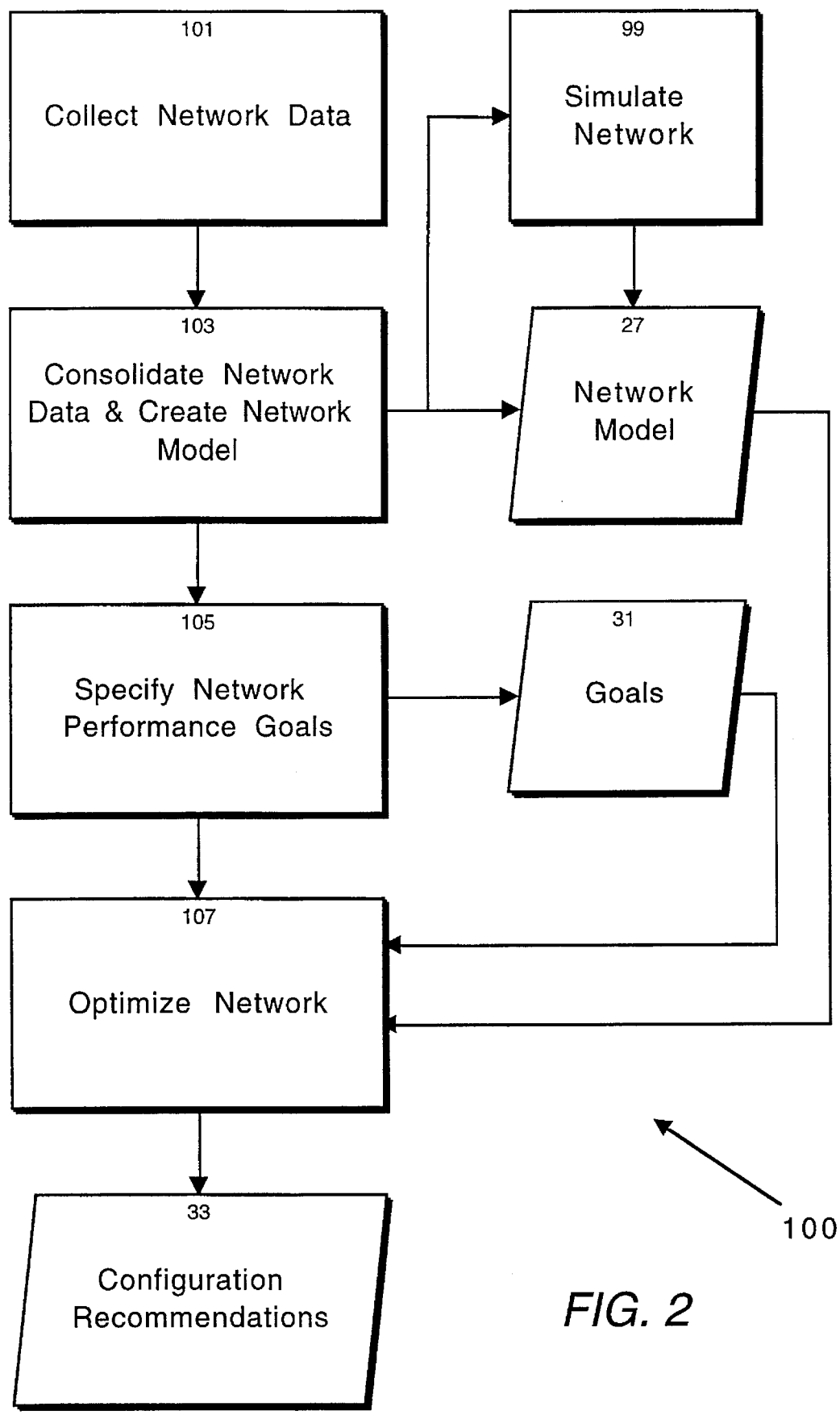
FIG. 2 is a block diagram illustrating the method of the present invention, showing the steps of collecting 101 network configuration data from segment collectors 17, consolidating 103 the network configuration data, to produce a network model 27, and optimizing 107 the network configuration.

Referring now to FIGS. 1 and 2, FIG. 1 shows a pictorial illustration the network elements used in the preferred embodiments of the apparatus and methods of the present invention, and FIG. 2 shows the method 100 of optimizing networks. Network 11 includes a number of LAN segments 13, each of which contains a plurality of nodes 16, a switching element 19, and a segment collector 17. Nodes 16 are individual computers connected to LAN segment 13. Each node 16 can contain a number of application programs, clients 15 (not shown), which communicate with a shared central resource 39. Switching elements 19, which can be routers, bridges, or the like, connect the individual LAN segments 13 along links 41, and allow communication between LAN segments 13 having different topologies and network protocols. Segment collector 17 monitors the LAN segment 13 to which it is attached and collects network traffic and topology data.

Referring to FIG. 2, optimization method 100 collects 101 data describing network 11, including its topology and traffic flow patterns. Data collection is accomplished in the preferred embodiment using segment collectors 17 on the LAN segments 13 of interest; information about other LAN segments 13 can be ignored if desired. These segment collectors 17 collect data local to their attached LAN segment 13. Some conventional networks 11 use segment collectors 17 (e.g. SNMP, RMON, network analyzers, etc.) which may relay the collected information to a network management console 23.

Next, optimization method 100 builds 103 an overall network model 27 from local data collected by segment collectors 17, using consolidator 25. In the preferred embodiment, the input to consolidator 25 comes either directly from segment collectors 17 or indirectly from segment collectors 17 via network management console 23. In either case consolidator 25 produces a network model 27 of the portions of network 11 for which data was collected, including its network topology, the clients 15, switching devices 19, links 41, LAN segments 13, the network protocols employed, and the traffic flows. Alternatively, network model 27 can be based on data acquired from both segment collectors 27 and network management console 23. In the preferred embodiment, consolidator 25 is implemented as a processor executing software routines stored in memory.

Where the objective is to design a new network, for which actual measured network data does yet not exist, a simulator 37 is used to generate network model 27, by describing the network elements, topology, and protocols. Simulator 37 simulates 99 (FIG. 2) the network model 27 for input to optimizer 29. Simulator 37 can also accept a network model 27 generated by consolidator 25, from real network data. This lets a network manager start with an existing network 11 and then model "what-if" changes 45 by simulating 99 the network model 27 of the modified network, and submitting that model to optimizer 29 for optimization 107. The "what-if" capabilities of simulator 37 let a network manager move network devices around, add applications, change one object type with another (e.g. from an ethernet LAN to an FDDI LAN, or from one router type to another), and the like. In the preferred embodiment, simulator 37 is implemented as a processor executing software routines stored in memory. The operation of simulator 37 will be described below.

Optimizer 29 accepts network model 27 and a set of network performance objectives defined in goals 31. Optimizer 29 is "unaware" of the source of network model 27, whether from simulator 37 or from consolidator 25, or both. Referring to FIG. 2, the user, typically a network manager, specifies 105 optimization goals 31. Optimization goals 31 can specify performance objectives with respect to either a shared central resource 39, or within a LAN segment 13. Goals 31 for shared central resource can be to minimize the average communication between a shared central resource 39 and all of its clients 15, to minimize the average number of switching elements 19 or links 41 traversed by data packets flowing between the shared central resource 39 and its clients 15, or to minimize the dollar cost incurred in communicating with the shared central resource 39.

Optimizer 29 then optimizes 109 the network configuration, and produces configuration recommendations 33 describing how to re-configure network 11 in order to achieve the network performance objective defined by goals 31. Optimizer 29 uses a set of optimization rules stored in memory 43 for optimizing 107 network 11 depending on goals 31. Where goals 31 specify the performance objectives for a shared central resource 39, optimizer 29 uses a center of gravity optimization process 200. Where goals 31 specify the performance objectives for a LAN segment 13, optimizer 29 uses a hub-tree optimization process 500. In the preferred embodiment, optimizer 29 is implemented as a processor executing optimizations processes 200 and 500 stored in memory 43.

Figure 3:
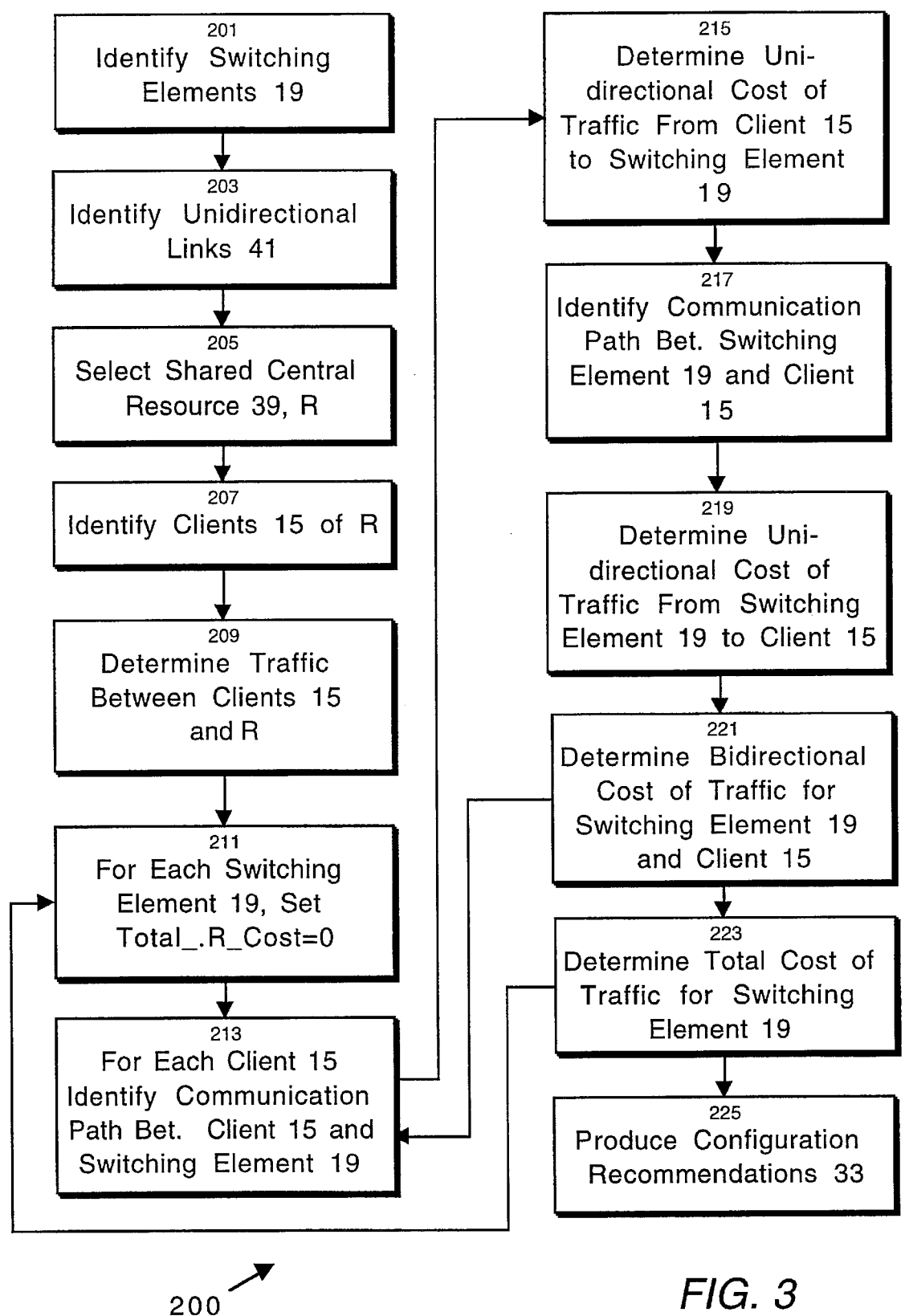
FIG. 3 is a block diagram illustrating the process of optimizing network 11 using the center of gravity optimization process 200.

Referring now to FIG. 3 there is shown a block flow diagram of the center of gravity optimization process 200 for optimizing 107 the position of shared central resource 39. Using network model 27 optimization process 200 identifies 201 all the available switching elements 19 to which shared central resource 39 may be attached. These switching elements 19 typically include LANs segments 13, routers, bridges, routing servers, LAN switches, and the like. The address or other unique identifier of each switching element 19 is stored in list SWITCH. The i-th switching element 19 in list SWITCH is SWITCH[i] where i=1, 2, . . . , S, S equal to the number of switching elements 19.

Next, from network model 27, all network links 41 interconnecting switching elements 19 of SWITCH are identified 203. Links 41 are uniquely identified and stored in list LINK. The l-th link in LINK is LINK[l] where l=1, 2, . . . , L, L equal to the number of links 41.

Next, optimization process 200 selects 205 a shared central resource 39 whose position is to be optimized 107 in network 11 with respect to its clients 15 and goals 31. This shared central resource 39 is designated R, and can represent a node 16 where shared central resource 39 is physically connected to some SWITCH[i]. Alternatively, R can represent some logical shared central resource 39, such as a database application running in a node 16, possibly sharing the node with other application programs. In this case R is "hosted" by node 16 which is in turn physically attached to some SWITCH[i].

Optimization process 200 then identifies 207 all clients 15 communicating with R. Clients 15 are distributed throughout network 11 in nodes 16 on various LAN segments 13. Clients 15 are uniquely identified and are stored in list CLIENT. The j-th client in list CLIENT is CLIENT[j] where j=1, 2, . . . , C, C being the number of clients 15 on network 11 communicating with shared central resource 39.

Optimization process 200 determines 209 the amount of network traffic known to flow between the given clients 15 and R over a given time t. These traffic flow amounts are stored in TRAFFIC. TRAFFIC has C elements, C being the number of clients 15 in CLIENTS. The j-th entry in TRAFFIC comprises TRAFFIC[j, client_r] for the unidirectional traffic flow (for example in bytes) from CLIENT[j] to R, and TRAFFIC[j, r_client] for the traffic from R to CLIENT[j]. TRAFFIC is formed from network model 27 using actual measurements, or through estimation, for example, using simulation by simulator 37.

The optimization goals 31 specified by the user are stored in list GOALS.

Optimization process 200 then loops through a series of "cost" analyses that determine the TOTAL_R_COST of positioning R, the shared central resource 39, at each of the switching elements 19 in SWITCH. Optimization process 200 determines the SWITCH[i] for which TOTAL_R_COST[i] is a minimum.

Each switching element 19 in SWITCH or LIST is a "hop." TOTAL_R_COST[i] is a function of the number of hops a data packet must travel when traversing network 11 between a client 15 and the shared central resource 39 when the shared central resource 39 is attached to SWITCH[i], and the cost of traversing each hop. The cost of a hop is described as follows.

Given a particular hop h and an optimization goal 31 termed "goal", function hop_cost(goal, h) assigns a cost metric to h relative to the given optimization goal 31. The cost metric is stated as a normalized quantity, for example delay time per byte, per bit or per packet. If optimization goal 31 is to minimize delay then hop_cost(goal, h) would return the known or estimated delay incurred while going through hop h. Alternatively, if optimization goal 31 is to minimize hops, then hop_cost(goal, h) returns a fixed value of 1 for any hop h. The hop cost function can be a multivariate function representing a combination of optimization goals 31, for example, a weighting of 70% minimized hops and 30% minimized delay.

In an alternative embodiment, hop costs are assigned by constructing a hop cost table. The network manager associates a hop cost metric for each hop. For example to position the shared central resource 39 so that link bandwidth is minimized, the hop cost table sets the link 41 hop cost to value of 3 and that of switching elements 19 to value 1. The hop costs computed by hop_cost(goal, h) are not necessarily the same as or even related to the hop costs used by the network routing protocol (e.g. RP or IGRP) used for computing a path between a client 15 and the shared central resource 39 since the route selection is governed by protocol standards. Using a hop cost table, optimization process 200 associates its own cost metric with each path produced by the network routing protocol. In either embodiment TOTAL_R_COST[i] is a function of the total hop cost of position R at each SWITCH[i].

Continuing then, optimization process 200 begins an iterative loop for each switching element 19 in SWITCH, that is each SWITCH[i], i equals 1 to S, setting 211 the TOTAL_R_COST[i] to zero.

A second iterative loop is begun for each client 15 in CLIENT to determine the path cost associated with traffic flow between each CLIENT[j], j equals 1 to C, and R, now assumed to be attached to SWITCH[i].

This cost is determined by identifying 213 the communication path from the client 15 to the switching element 19 to which R, the shared central resource 39, is attached. Specifically, PATH[j, i] is the communication path from CLIENT[j] to SWITCH[i] to which R is attached. The path taken from CLIENT[i] to SWITCH[j] in network 11 depends on the particular ISO level 3 network layer protocol (e.g. IP, IPX, XNS, AppleTalk) "spoken" between a client 15 and the shared central resource 39. This is because certain switching elements 19, such as routers, operate by looking "into" a particular data packet to determine its protocol. Router ports can be configured to be protocol "sensitive"—letting one protocol type through (e.g. IP) but not another (e.g. XNS). Consequently, the particular network level protocol employed in communicating between a client 15 and R, the shared central resource 39, must be known in order to determine the communication path between them.

A particular path PATH[i, i] traversed from CLIENT[j] to SWITCH[i] includes a sequence of hops, as described above. The path is determined from either actual measurements by the segment collectors 17 or can be determined using the network routing protocol and the particular protocol filtering settings of the ports of ISO Level 3 switching elements 19. While in many cases PATH[j, i] will be the same as PATH[i, j] the preferred embodiment does not rely on such an assumption. For example, one direction of a full duplex link, such as link 41, may carry a load of 90% and exhibit high delay while the other direction may at the same time carry a lower load of only 10% and thus exhibit lower delay. Therefore, in general PATH[j, i] and PATH[i, j] are not the same. While the actual path taken is governed exclusively by the routing protocol employed in network 11 (such as IP or IPX), the preferred embodiment outlined here has no control over the path selection. Optimization process 200 is however capable of determining the path that would be selected by the network routing protocol from any point in network 11, such as a client 15, to any other point in network 11, such as the position of R.

Having determined the path PATH[j, i] between client 15 under consideration and the current proposed switching element 19, the function hop_cost(goal, h) determines 215 for each hop h along the path PATH[j, i] the UNIDIRECTIONAL_COST[j, i] of traffic from CLIENT[j] to R attached to SWITCH[i]. UNIDIRECTIONAL_COST[i, j] is the cost of transporting a given amount of traffic from SWITCH[i] to CLIENT[j] over path PATH[i, j]. It is the sum of all hop costs, as determined by the hop_cost function, traversed along path PATH[i, j] and the amount of traffic TRAFFIC[j] transported along that path.

As stated above, optimization process 200 does not assume or require that the path of traffic from the shared central resource 39 to client 15 be the same as the path from the latter to the former. Accordingly, optimization process 200 next identifies 217 the communication path from the switching element 19 to which the shared central resource 39 is attached to the client 15. This is PATH[i, j] from R attached to SWITCH[i] to CLIENT[j].

Next, using function hop_cost(goal, h), optimization process 200 determines 219 for each hop h along the path PATH[i, j] the UNIDIRECTIONAL_COST[i, j] of traffic from R attached to SWITCH[i] to CLIENT[j].

Having determined the unidirectional costs of transporting a data packet over network 11 back and forth between a client 15 and a switching element 19, optimization process 200 then determines 221 the bi-directional cost. BIDIRECTIONAL_COST[i, j] represents the total traffic flow cost between i and j in both directions. If R is attached to SWITCH[i] then BIDIRECTIONAL_COST[i, j] reflects the total bi-directional traffic cost between R and CLIENT [j]. BIDIRECTIONAL_COST[i, j] equals:

$$\text{UNIDIRECTIONAL\_COST}[i, j] + \text{UNIDIRECTIONAL\_COST}[j, i] \qquad \text{Eq. (1)}$$

Clearly BIDIRECTIONAL_COST[i, j]=BIDIRECTIONAL COST[j, i].

Once the bi-directional cost from the client 15 is determined, it is summed 223 to the TOTAL_R_COST for the current switching element 19. This is expressed as:

$$\text{TOTAL\_R\_COST}[i] = \text{TOTAL\_R\_COST}[i] + \text{BIDIRECTIONAL\_COST}[i, j] \qquad \text{Eq. (2)}$$

TOTAL_R_COST[i] thus represents the total cost of positioning shared central resource 39 on the switching elements of SWITCH[i] with respect to all its clients 15. Optimization process 200 then loops back in the second iterative loop for each client 15, that is each CLIENT[j]. Once all clients 15 for shared central resource 39 are examined, optimization process loops 200 back to the first iterative loop, and repeats the cost function analysis for the next proposed switching element 19, SWITCH[i].

When all switching elements 19 have been examined as possible attachment points for shared resource 39, the TOTAL_R_COST[i] for each switching element 19 will be known. Optimization process 200 then produces 225 configuration recommendation 33 in the form of a sorted table comprised of entry pairs <i, TOTAL_R_COST[i]> sorted by increasing values of TOTAL_R_COST[i], again i indicating each switching element 19 in SWITCH. The closer a particular entry is to the beginning of the table in configuration recommendation 33, the lower its TOTAL_R_COST measure, and the higher its "merit". The first entry in configuration recommendation 33 is the optimal switching element 19 to which shared central resource 39 should be attached.

Figure 4:
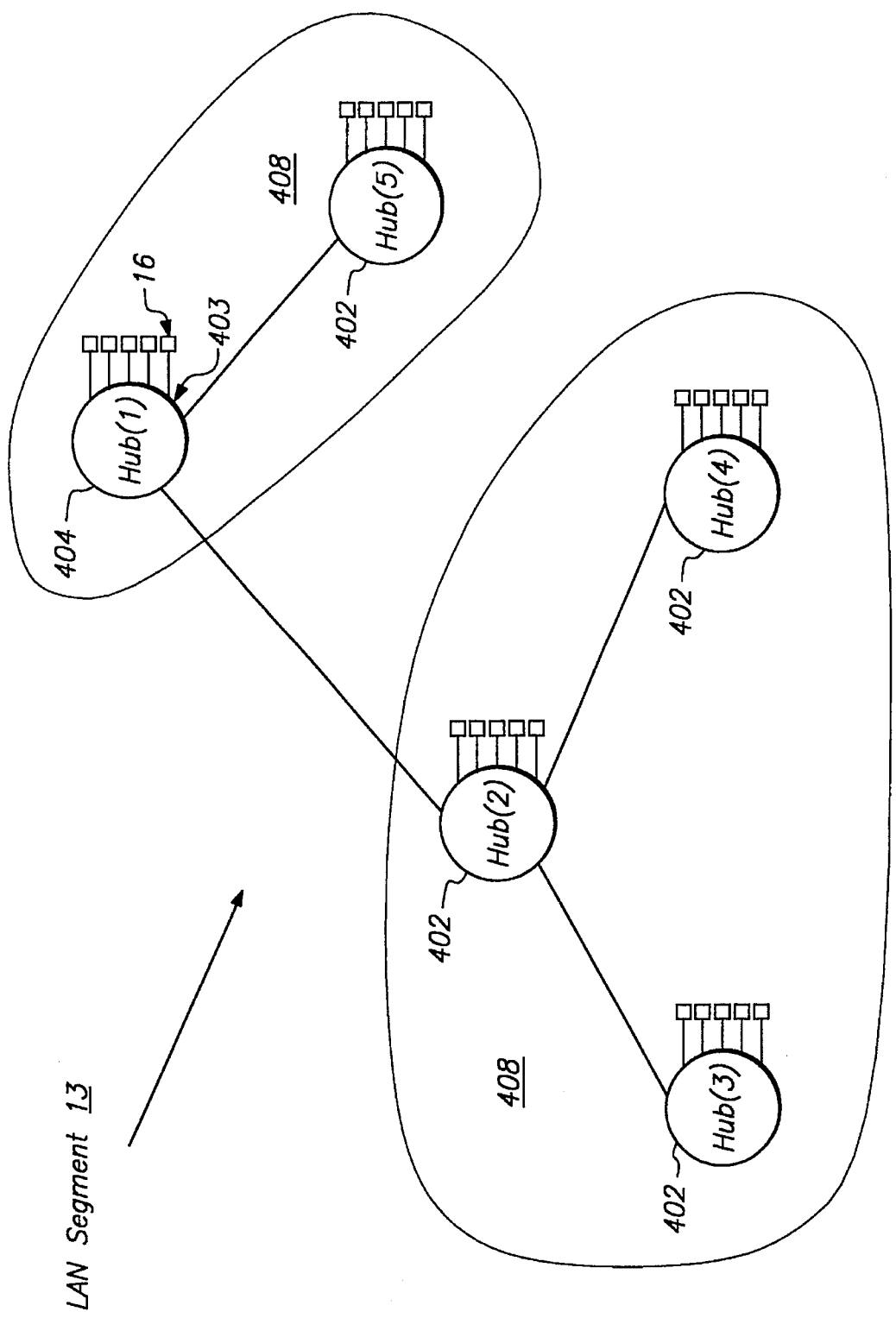
FIG. 4 is a pictorial illustration of a LAN segment 13 having hubs 402, and partitions 408.

Referring now to FIG. 4, there is shown a pictorial illustration of a LAN segment 13 having partitions 408. Typically, LAN segments 13 are physically organized as a collection of hubs 402 interconnected among themselves so as to form a tree structure. A node 16 is attached to a LAN segment 13 via a port 403 on a hub. In each LAN segment 13 there is a root hub 404 which forms the top the hub tree in that LAN segment 13. The hubs 402 forming a LAN segment 13 are typically scattered throughout a local area such as on different floors of an office building or throughout a university or industrial campus. The maximum allowed wiring length between hubs 402 depends on the particular LAN technology employed and typically varies from a few hundred yards to well over a few miles. Regardless of the particular tree structure or area spanned, all clients attached to a LAN segment 13 are part of the same LAN. For example, if a LAN segment 13 is an ethernet LAN then all the LAN nodes 16 are part of the same "collision domain", or if the LAN segment 13 is a token ring all its nodes 16 share the same token.

When the traffic load on LAN segment 13 increases, the time delay for completion of a transmission also increases, usually in some exponentially related manner. One method of increasing performance is to replace the LAN segment 13 with one having higher throughput. This solution tends to be very expensive since all the hubs 402 and all the interface cards on nodes 16 need to be changed. In many cases it would be much more economical to partition LAN segment 13 into two independent LAN segments 13 so as to lower the traffic load on each of the two new LAN segments 13. The two segments would then be interconnected via an existing or a new switching element 19.

The traffic patterns among users in a network tend to follow the actual business work flow: users working in the same department (e.g. accounting) or on the same project tend to communicate among themselves more often then to users outside of their work group (accountants would rarely communicate with users in the R&D department). Such user groups also tend to be physically co-located (e.g., share the same floor) and therefore attach to the same LAN segments 13 and hubs 402. Accordingly, hub-tree optimization process 500 identifies the "natural" user groups and partitions the LAN segment 13 so as to minimize the "interference" among unrelated user groups. The LAN segment 13 is partitioned with a switching element 19 placed between the partitions; this preserves the existing wiring plan of the LAN segments and significantly reduces the cost of increasing the performance of the LAN segment 13.

Figure 5:
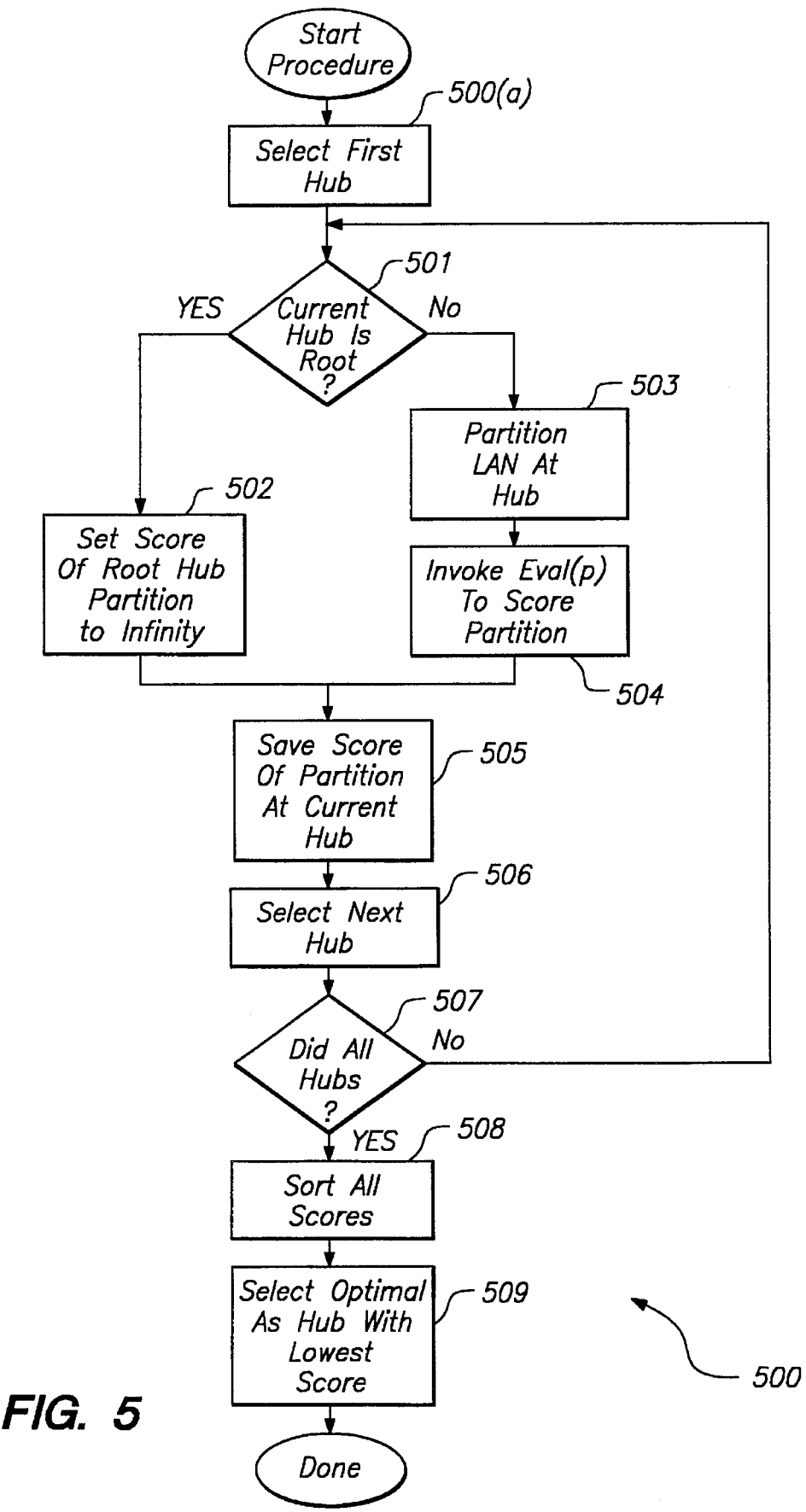
FIG. 5 is a block diagram illustrating the process optimizing network 11 using the hub-tree optimization process 500.

Referring now to FIG. 5, there is shown hub-tree optimization process 500 for determining the optimal hub 402, namely, to identify hub(opt) producing the optimal partition of LAN segment 13 relative to a goal 31. Hub tree optimization process 500 examines N−1 possible ways to partition LAN segment 13, associating a "score" with each such partition, where N is the number of hubs 402 in LAN segment 13. It is unnecessary to partition LAN segment 13 at its original root hub 404 since it will produce the original tree formation of LAN segment 13. Hence, only N−1 different ways to partition LAN segment 13 are examined, not N. The particular partitioning resulting the lowest score is the optimal partition. When the optimal hub(opt) is determined, LAN segment 13 will be split into two partitions 408, one partition including of hub(opt) and all the hubs in its subtree, and a second partition which is a tree rooted at the root hub 404 and including of the original LAN segment 13 tree less the partition at hub(opt). In this case hub(p) becomes the root of the first partition.

Hub-tree optimization process 500 employs the following definitions:

PA(p) is the hub tree structure of LAN segment 13 consisting of hub(p) and all hubs 402 in its subtree. An example of PA(p) is seen on FIG. 4, with Hub(2) as hub(p), and Hub(3) and Hub(4) as its subtree. PB(p) is the balance of LAN segment 13 excluding PA(p). In FIG. 4, it is represented by partition 408 containing Hub(1) and Hub(5).

M is the total number of nodes 16 attached to LAN segment 13.

N is the total number of hubs 402 forming LAN segment 13. A hub 402 is identified by a numerical identifier, 1, 2, . . . , N. The i-th hub 402 is denoted as "hub(i)". Hub(i) represents the identity of each source hub 402 originating traffic on LAN segment 13, where i=1, 2, . . . , N. Hub(j) represents the identity of each hub 402 receiving traffic on LAN segment 13, where j=1, 2, . . . , N. Hub(p) represents the identity of each destination hub 402 used to partition LAN segment 13, where p=1, 2, . . . , N, where the identity of root hub 404 is excluded.

Figure 6:
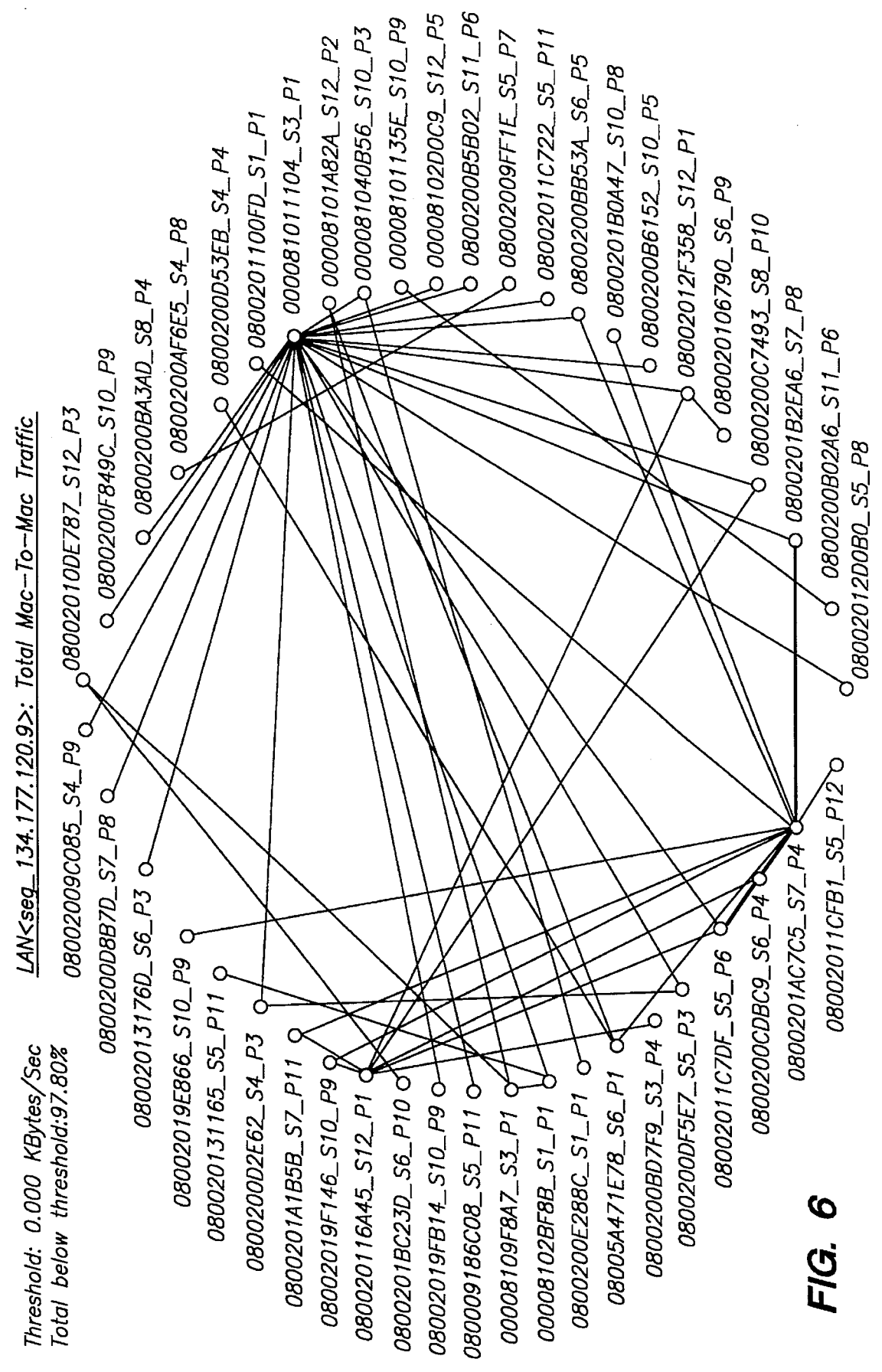

List MMT is an M by M traffic matrix of the amount of unidirectional MAC (medium access control) level traffic flowing between every pair of nodes 16. MMT is attained from actual measurements from segment collectors 17 or from estimation (for example using simulator 39). FIG. 6 is a pictorial representation of the bi-directional node to node traffic flow collected on a real hub LAN.

List HHT is an N by N traffic matrix of the amount of unidirectional traffic flowing between every pair of hubs 402 on LAN segment 13. It is derived from MMT and data identifying which node 16 is attached to which hub 402. Accordingly, hub(i) originates an amount of traffic HHT[i, j] to hub(j) where nodes 16 attached to hub(i) collectively transmit an amount of traffic HHT[i, j] bytes to nodes 16 attached to hub(j).

LA is the total traffic originating at nodes 16 attached to hubs 402 in partition PA(p) and destined to nodes 16 also in PA(p). This is the "local" traffic of PA(p), because it includes only traffic within PA(p).

LB is the total traffic originating at nodes 16 attached to hubs 402 in partition PB(p) and destined to stations also in PB(p). This is the "local" traffic of PB(p).

A_B is the total traffic originating at nodes 16 attached to hubs 402 in PA(p) and flowing to nodes of hubs 402 in PB(p). This is the total one way traffic from partition PA to partition PB for a given hub(p).

B_A is the total traffic originating at nodes 16 attached to hubs 402 in PB(p) and flowing to nodes 16 of hubs 402 in PA(p).

A is the total traffic flow on partition PA(p), defined as:

$$A=LA+B\_A. \qquad \text{Eq. (3)}$$

B is the total traffic flow on partition PB(p), defined as:

$$B=LB+A\_B. \qquad \text{Eq. (4)}$$

TOTAL is the total "end-to-end" traffic originating at (and terminating on) nodes 16 of the original LAN segment 13:

$$TOTAL=LA+LB+A\_B+B\_A. \qquad \text{Eq. (5)}$$

C is the total amount of traffic flowing (crossing) between PA(p) and PB(p) via a switching element 19 connecting PA(p) and PB(p):

$$C=A\_B+B\_A. \qquad \text{Eq. (6)}$$

In summary, A, B, LA, and LB represent the amount of traffic flow within and between each of the partitions PA(p) and PB(b) of LAN segment 13 for a given partition at hub(p). These variables describe the traffic load experienced by each of partitions, measured in bytes per second. A_B and B_A represent the traffic load exerted by the partitions on a switching element 19 between partitions PA(p) and PB(p). The traffic amounts are directly related to the time delay experienced by a node 16 in transmitting data to another node 16 in LAN segment 13.

The score for each hub(p) is a function of the network performance objectives defined by the user in goals 31. Goals 31 can include minimizing the maximum load on the partitions created by partitioning LAN segment 13 at hub(p). That is, for a hub(p):

$$\text{score}=\text{minimum}(A, B). \qquad \text{Eq. (7)}$$

Where goal 31 is to minimize the mean load on PA(p) and PB(p):

$$\text{score} = \text{square root}(A*A+B*B). \qquad \text{Eq. (8)}$$

Alternatively, score can be defined as a general scoring function:

$$\text{score} = f(A, B, C). \qquad \text{Eq. (9)}$$

which assigns a score dependent on the values of the traffic variables A, B, C. For example, Eq. (9) can define a function for scoring hub(p) based on the delays incurred when going through a switching element 19 between the partitions on LAN segment 13 at hub(p). The delays in and between partitions PA(p) and PB(p) are themselves functions of the traffic values A, B, and C. The scoring function can assign a score which is equal to the average byte delay depending on which of PA(p), PB(p) or the switching element 19 participate in transmitting the byte from its source node 16 to the destination node 16. The functions can be based on either actual network traffic and delay data acquired by segment collectors 17, or thorough simulation by simulator 39.

List ST is a score table of size N storing the score of each of the N–1 partitions examined. ST[p] stores the score of the partition at hub(p). Because root hub 404 is excluded from the partitioning its corresponding entry in ST is set to infinity (the worst possible score).

List SST is the sorted score table derived from a sort of ST. It is a two column table with N rows, the first column representing the score value and the second column representing the identity p of the hub 402 corresponding to the given score. SST is sorted by increasing sort values so that the lowest score value, representing the optimal partition, is at the top. The p corresponding to root hub 404 is at the bottom of SST (at the N-th row) with a score value of infinity.

Finally, a hub(x) is "in" PA(p) if hub(x) is a hub 402 located in partition PA(p) rooted at hub(p). Similarly a hub(x) is "in" PB(p) if hub(x) is a hub 402 located in partition PB(p) rooted at hub(p).

Referring again to FIG. 5, hub-tree optimization process 500 begins by an iterative loop for all hub(p) by initializing 500(a) a loop counter p, with p equal to 1, and looping from 1 to N, for each of the hubs 402 to be examined as hub(p).

Next, optimization process 500 tests 501 if hub(p) is root hub 404. If hub(p) is root hub 404, then its score is set 502 to infinity, stored 505 in ST at ST[p].

If hub(p) is not root hub 404 then LAN segment 13 is partitioned 503 into PA(p) and PB(p). Procedure Eval(p), described below, is invoked 504 to determine the score for the given partitions at hub(p). Following procedure Eval(p), the score is stored 505 in table ST at entry ST[p].

Next the loop counter for p is incremented 506. A conditional tests 507 if all hubs 402 on LAN segment 13 have been examined, that is where p is greater than N. If p is less than N, optimization process 500 loop back to test 501 and proceeds as described above. If test 507 determines that p is greater than N, then all hubs 402 have been examined, and score table ST is sorted 508 to form the sorted score table SST.

SST is then output 509 as configuration recommendation 33, identifying the optimal hub(opt) from the hub column of the first row of table SST.

Figure 7:
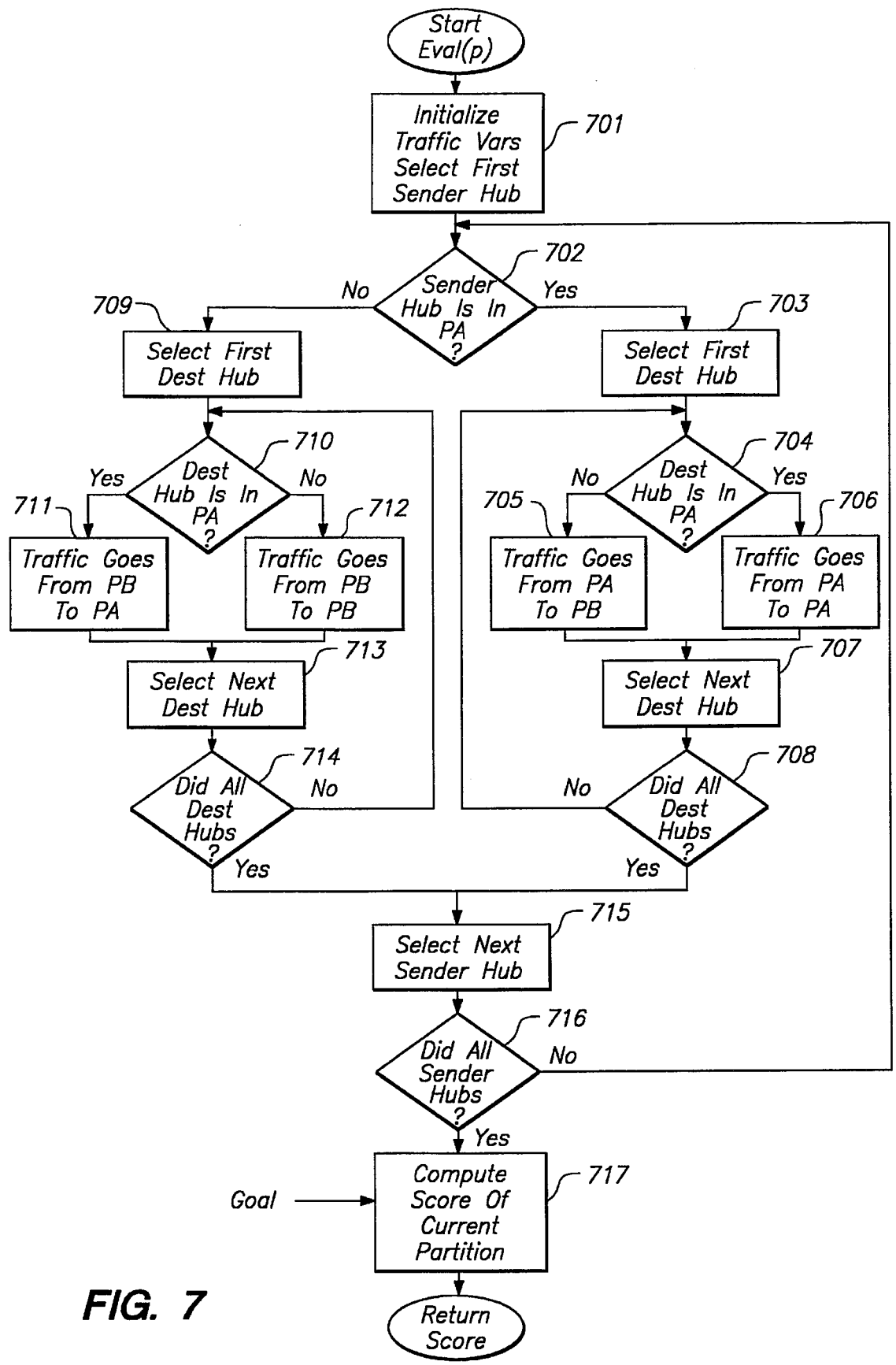
FIG. 7 is a block diagram illustrating the process of scoring the partitions during hub tree optimization process 500.

Referring now to FIG. 7 there is shown a flowchart of procedure Eval(p) used at step 504 in hub tree optimization process 500 above.

Given the particular hub(p) and partitions PA(p) and PB(p) generated by hub(p), procedure Eval(p) determines the rate of traffic flow for each of the traffic flow variables A, B, LA, LB, A_B, and B_A. That is, procedure Eval(p) determines the average traffic load in and between each of the partitions PA(p) and PB(b). Procedure Eval(p) then computes the score of hub(p) given goals 31 and the values of the traffic variables set forth above. Traffic variable C is not shown to be determined here because it is implied by the scoring function from C=A_B +B_A.

Given a partition at hub(p), procedure Eval(p) loops over variable i to determine the "contribution" of traffic originating at hub(i) to each of the traffic variables. When the loop over i is exhausted the traffic variables contain their final values and the score can be computed.

Accordingly, all traffic variables (A, B, LA, LB, A_B, and B_A) are initialized 701 to zero, and a loop counter for i for source hubs(i) is initialized 701 to 1.

Next hub(i) is tested 702 to determine if it is "in" partition PA(p) or PB(p). If hub(i) is in PA(p), then a loop counter for the destination hubs(j) is initialized 703 to 1. This begins an iterative loop over j=1, 2, . . . , N to determine which partition receives the unidirectional traffic stream HHT[i, j]. In other words, this loop determines the total intra and inter partition traffic originating at hub(i). This determination is made as follows:

First, a conditional tests 704 if hub(j) is in PA(p) or PB(p). If hub(j) is in PA(p) then summation 706 is performed. If on the other hand hub(j) is in PB(p) then summation 705 is performed.

Summation 706 adds HHT[i, j] to each of traffic flows A and LA. Summation 706 covers the case where both hub(i) and hub(j) are in PA(p). This traffic is purely local to PA(p), contributing no traffic to PB(p) or cross traffic from PA(p) to PB(p).

Summation 705 adds HHT[i, j] to each of traffic flows A, B and A_B. Summation 705 covers the case where hub(i) is in PA(p) and hub(j) is in PB(p). Here the traffic stream originates in PA(p) but flows across to PB(p). It thus contributes to the traffic load on PA(p) (i.e. traffic flow A) as well as on PB(p) (i.e. traffic flow B) and the switching element connecting PA(p) to PB(p) (i.e. A_B).

Following both summations 705 and 706, loop j counter for the destination hub(j) is incremented 707. J is tested 708 and if it exceeds N, then all destination hubs(j) have been examined, and the loop counter of i for the source hub(i) is incremented 715. If after incrementing loop counter j its value does not exceed N, then the loop beginning at test 704 is repeated for the next destination hub(j).

Returning to test 702, if hub(i) is not in PA(p), then it is in PB(p), and steps 709 through 714 are engaged; these steps are the equivalent to steps 703 through 708, as described above, with each of the tests and summations being performed with respect to PB(p). Specifically, test 710 determines whether hub(j) is in PA(p).

If so, then HHT[i, j] is summed 711 to each of traffic flows A, B, and B_A. Summation 711 covers the case where hub(i) is in PB(p) and hub(j) is in PA(p). Here the traffic stream originates in PB(p) but flows across to PA(p). It thus contributes a traffic load on PB(p) as well as on PA(p) and the switching element 19 connecting PB(p) to PA(p).

If not, then HHT[i, j] is summed 712 to each of traffic flows B and LB. Summation 712 covers the case where both hub(i) and hub(j) are in PB(p). The traffic is purely local to PB(p) contributing no traffic to PA(p) or cross traffic from PB(p) to PA(p).

Following both summations 711 and 712, loop j counter for the destination hub(j) is incremented 713. J is tested 714 and if it exceeds N, then all destination hubs(j) have been examined, and the loop counter of i for the source hub(i) is incremented 715. If after incrementing loop counter j its value does not exceed N, then the loop beginning at test 710 is repeated for the next destination hub(j).

At this point all destination hubs (j) for a given source hub(i) have been examined. Next, the loop counter i for source hubs(i) is incremented 715. Test 716 determines if all source hubs(i) have been examined, that is, if the incremented value of i exceeds N. If i does not exceed N then the loop beginning at test 702 is repeated for the next source hub(i).

Once all source hubs(i) for a given partition at hub(p) have been examined, then the score for hub(p) is determined 717, using the traffic flow variables determined within procedure Eval(p). It is at this point, having determined the appropriate traffic flow quantities through the given LAN segment 13 partitions 408 at hub(p), that the optimality of the partition be evaluated with respect to the network performance objectives defined by the user in goals 31. The score value for hub(p) reflects the effectiveness of partitioning LAN segment 13 at hub(p).

Upon determination of the score at hub(p), control is return to optimization process 500, as describe above.

Tables 1 and 2 below illustrate the results of a hub tree optimization process 500 applied to an actual LAN segment 13 called "<134.177.120.9>" whose traffic flow is shown in FIG. 6. The optimization goal 31 was set to "minimize the maximum load". The LAN segment 13 started off with a load of 61%. Optimization process 500 resulted in two segments partitioned at a hub 402 called "<134.177.120.9_hub9>." The resulting partitions now operate at 21% and 42% of maximum segment capacity. That the sum of the two loads is above the original LAN segment load of 61% indicates that some (very little) traffic is crossing between the two new segments. Decreasing a segment load from 61% to 42% typically reduces the delay by a factor of about 10 because at a load of 61% the segment operates much above the "knee" of the non-linear delay vs. load curve.

TABLE 1

| Partition 1 Node List - expected load 21% ||
|---|---|
| 000081011104_S3_P1 | 0800200B5B02_S11_P6 |
| 08002011C722_S5_P11 | 0800200BB53A_S6_P5 |
| 08002011D46F_S5_P5 | 0800200C7493_S8_P10 |
| 080020116A45_S12_P1 | 080020109818_S12_P12 |
| 0800201AFE49_S3_P2 | 08002010F150_S10_P1 |
| 08002012F358_S12_P1 | 0800200CDBC9_S6_P4 |
| 08002012E393_S5_P10 | 0800201B43E1_S7_P6 |
| 0800201AF1F4_S12_P4 | 0008103BF8B_S1_P1 |
| 080020131165_S5_P11 | 080009186C08_S5_P11 |
| 000081FFE097_S4_P1 | 080020088211_S1_P1 |
| 08002019FB14_S10_P9 | 08002013281A_S5_P6 |
| 0800200C1926_S1_P1 | 08002019F146_S10_P9 |
| 0800200D2E62_S4_P3 | 0800200DF5E7_S5_P3 |
| 0800201B4269_S8_P3 | 0800200D8B7D_S7_P8 |
| 08002011327F_S5_P2 | 08002009C085_S4_P9 |
| 0800200E178C_S1_P1 | 0800200F849C_S10_P9 |
| 0800200BA3AD_S8_P4 | 08002012CBB9_S1_P1 |
| 0800200BBCC7_S5_P1 | 0800201310DF_S4_P1 |
| 0800200B72E0_S1_P1 | 0800200D53EB_S4_P4 |
| 08002019E8ED_S10_P9 | 08002012C6F9_S4_P5 |
| 0800201100FD_S1_P1 | 000081040B56_S10_P3 |
| 0800200E288C_S1_P1 | 0000810110A3_S12_P4 |
| 00008102D0C9_S12_P5 | |

TABLE 2

| Partition 2 Node List - expected load 42% ||
|---|---|
| 0800201AC7C5_S7_P4 | 0800201B2EA6_S7_P8 |
| 08002011CFB1_S5_P12 | 0800200BCFCB_S6_P8 |
| 080009707D3B_S6_P8 | 08002011C7DF_S5_P6 |
| 08005A0D5A11_S12_P5 | 0800201B0A47_S10_P8 |
| 0800200BC44D_S6_P12 | 0800200B6152_S10_P5 |
| 0800201B0BA0_S10_P10 | 08002012D0B0_S5_P8 |
| 080020091EB8_S5_P7 | 0800200BD7F9_S3_P4 |
| 00008101A2E1_S9_P9 | 00608CBBE440_S3_P8 |
| 08000962FE18_S1_P1 | 0800200A3F59_S1_P1 |
| 0800200DCCDA_S1_P1 | 0800200D5968_S4_P2 |
| 08002013176D_S6_P3 | 08002019E689_S9_P4 |
| 0800201AECC6_S5_P10 | 0800201BC2E6_S8_P7 |
| 02608C8EAA14_S6_P8 | 02608C4C92B3_S1_P1 |
| 02608C8EB0BF_S11_P8 | 08005A471E78_S6_P1 |
| 080020129666_S7_P5 | 08005A471DD2_S6_P10 |
| 00608C63C3B3_S9_P1 | 02608CA6D90B_S3_P10 |
| 02608C465F22_S5_P4 | 02608CA4069F_S5_P2 |
| 02608C8EAAC7_S8_P2 | 02608CA630E8_S10_P3 |
| 08005A47227B_S1_P1 | 08002012BC0E_S10_P9 |
| 0800201A1B5B_S7_P11 | 0800200D57E0_S10_P9 |
| 00008101A82A_S12_P2 | 0000810243E4_S10_P9 |
| 02608C3ED716_S7_P4 | 02608C406F5F_S11_P4 |
| 02608C4BFA89_S7_P3 | 02608C415C8F_S6_P7 |
| 02608C43D5EC_S7_P10 | 08002B1AC4F7_S1_P1 |
| 00008101A2B6_S3_P10 | 08002019E866_S10_P9 |
| 08002010DF87_S12_P3 | 0800201B3F3B_S12_P2 |
| 0800200CFF62_S11_P6 | 0800200BE9E9_S12_P5 |
| 00008109F8A7_S3_P1 | 0800200BB53B_S1_P1 |
| 0800201BC23D_S6_P10 | 08002018535F_S11_P10 |
| 0800200D9A72_S10_P7 | 0800201068A7_S7_P1 |
| 0800200AF6E5_S4_P8 | 08002009FF1E_S5_P7 |
| 00008101135E_S10_P9 | 08002013116B_S7_P2 |
| 0800200B92A6_S11_P6 | 080020106790_S6_P9 |
| 02608C2EC81B_S5_P11 | |

Returning now to FIG. 3, the operation of simulator 37 will be described. Simulator 37 operates in a manner similar to optimizer 29. Like optimizer 29, simulator 37 determines the pattern of traffic flow within a hypothetical network arrangement. Where optimizer 29 determines the traffic flow for each of a series of network configurations based on differing locations for a shared central resource 39, simulator 37 determines the traffic flow of any hypothetical change in the network, not just the relocation of a shared central resource 39. Using a configuration of network 11 and the total end to end traffic between any pair of communicating network devices, as supplied by either a user or segment collectors 17, simulator 37 determines the communication path taken by each communication pair. It does this using the same procedures as steps 213 and 217 of optimization process 200. Simulator 37 then determines the total flow through each network device by accumulating the partial traffic contributions of each pair of communicating network device. This produces a network model 27 of the network configuration and traffic flow patterns. Simulator 37 does not require simulation of the events of each data packet flowing between communication pairs.

I claim:

1. For a network including a plurality of interconnected network segments forming a network configuration, each network segment having at least one node, the network having at least one shared central resource interconnected in a network segment, a computer implemented method of optimizing the network configuration, comprising the computer executed steps of:

creating a network model of network traffic flow and network topology;

receiving an input specifying at least one network performance goal;

selecting at least one optimization rule as a function of the specified at least one network performance goal; comprising, optimizing the network configuration by determining an optimal network traffic flow using the selected at least one optimization rule by:

identifying at least one switching element on the network;

selecting a shared central resource;

identifying all clients on the network communicating with the shared central resource;

for each switching element, determining from the network model a network traffic flow between the shared central resource as positioned at the switching element and all clients communicating with the shared central resource;

determining a traffic cost for each network traffic flow according to the network performance goal; and comparing said traffic costs to determine the switching element having a lowest traffic cost.

2. The method of claim 1 wherein the step of determining a traffic cost for each network traffic flow, further comprises the step of:

determining a hop cost for the network traffic flow.

3. The method claim 2 wherein the hop cost is a function of the network performance goal.

4. The method of claim 2 wherein the hop cost is a function of a delay between a client and the shared central resource.

5. The method of claim 2 wherein the hop cost is a function of the number of switching elements between a client and the shared central resource.

6. The method of claim 2 wherein the hop cost is determined from a hop cost table.

7. The method of claim 2 wherein the step of determining a hop cost for the network traffic flow, further comprises the steps of:

identifying a communication path between a client and the shared central resource; and determining a hop cost for network traffic flow along the communication path.

8. The method of claim 7 wherein the step of identifying a communication path, further comprises the steps of:

identifying a communication path from a client to the shared central resource; and identifying a communication path from the shared central resource to a client.

9. The method of claim 1 wherein the step of determining a traffic cost for each network traffic flow, further comprises the steps of:

determining for each client a total bidirectional hop cost for communication between the client and the shared central resource; and summing the total bidirectional hop costs to produce a network traffic cost for a switching element.

10. For a network including a plurality of interconnected network segments forming a network configuration, each network segment having at least one node, the network having at least one shared central resource interconnected to a network segment, the network segment including a hub tree structure having at least one parent hub coupled to at least one child hub, a computer implemented method of optimizing the network configuration, comprising the computer executed steps of:

creating a network model of network traffic flow and network topology;

receiving an input specifying at least one network performance goal;

selecting at least one optimization rule as a function of the specified at least one network performance goal; and, optimizing the network configuration, using the selected at least one optimization rule to position a switching element at an optimal position between two coupled hubs by:

partitioning a network segment between a child hub and its parent hub, creating a partition including the child hub and a partition including the parent hub;

scoring each partition of the child hub according to the network traffic flow of the partitions of the child hub, and associating the scores of the partitions with the child hub as a score for the child hub;

repeating the steps of partitioning and scoring for each child hub of the network segment; and selecting the child hub having a lowest score for positioning the switching element between the child hub and its parent hub.

11. The method of claim 10 wherein the step of scoring each child hub, further comprises the steps of:

determining an intrapartition network traffic flow for the child hub;

determining an interpartition network traffic flow for the child hub;

combining the interpartition and intrapartition network traffic flows; and scoring the combined network traffic flows.

12. The method of claim 11 wherein the step of determining an interpartition network traffic flow, further comprises the steps of:

determining a first network traffic flow from a first partition to a second partition;

determining a second network traffic flow from the second partition to the first partition; and summing the first and second network traffic flows.

13. The method of claim 11 wherein the step of scoring the combined network traffic flows further comprises the step of:

computing a scoring function f(A, B, C), where A is the network traffic flow within a first partition plus the network traffic flow from a second partition to the first partition, where B is the network traffic flow within a first partition plus the network traffic flow from the first partition to the second partition, and C is the interpartition network traffic flow.

14. The method of claim 11 wherein the step of scoring the combined network traffic flows further comprises the step of:

computing a function of an average byte delay during a data transmission between a source hub and a destination hub.

15. The method of claim 10 wherein step of scoring the network traffic flow minimizes a maximum network traffic flow of the partitions.

16. The method of claim 10 wherein the step of scoring the network traffic flow minimizes a mean network traffic flow of the partitions.

17. A computer implemented method for optimizing a position of a switching element in a network segment of a network having at least a parent hub coupled to at least one child hub comprising the steps of:

simulating a partitioning of the network segment between a child hub and its parent hub to produce two partitions coupled across a hub;

scoring the child hub according to a network traffic flow of the partitions of the child hub by:
  determining an intrapartition network traffic flow for the child hub;
  determining an interpartition network traffic flow for the child hub;
  combining the interpartition and intrapartition network traffic flows;
  scoring the combined network traffic flows;

repeating the steps of simulating and scoring for each child hub;

selecting the child hub having a lowest score; and, configuring the network by partitioning the network segment at the selected child hub and placing the switching element between the child hub and its parent hub.

* * * * *

UNITED STATES PATENT AND TRADEMARK OFFICE
CERTIFICATE OF CORRECTION

PATENT NO. : 5,598,532
DATED      : January 28, 1997
INVENTOR(S): Moshe Liron

It is certified that error appears in the above-indentified patent and that said Letters Patent is hereby corrected as shown below:

Column 7, line 25, delete "[i,i]" and insert --[j,i]--.

In claim 1, column 15, line 2-3, delete "comprising".

Signed and Sealed this

First Day of July, 1997

Attest:

BRUCE LEHMAN

Attesting Officer

Commissioner of Patents and Trademarks